United States Patent
Brown

[19]

[11] Patent Number: 6,064,668
[45] Date of Patent: May 16, 2000

[54] DEVICE CONTROL APPARATUS HAVING INPUT DEVICE SELECTION SWITCH WITH RUBBERIZED KEY

[75] Inventor: Paul Anson Brown, Sunnyvale, Calif.

[73] Assignee: SP Controls, Inc., Sunnyvale, Calif.

[21] Appl. No.: 08/963,001

[22] Filed: Oct. 31, 1997

[51] Int. Cl.[7] ............................ H04B 10/00; G02B 27/20
[52] U.S. Cl. ............... 370/357; 340/825.17; 340/825.72; 341/22
[58] Field of Search ..................... 340/825.17, 825.24, 340/825.25, 825.69, 825.72; 341/20, 176; 348/734; 370/357

[56] References Cited

U.S. PATENT DOCUMENTS

| | | | |
|---|---|---|---|
| 4,306,782 | 12/1981 | Sobotta | 353/119 |
| 4,712,105 | 12/1987 | Kohler | 340/825.72 |
| 5,097,249 | 3/1992 | Yamamoto | 340/310 CP |
| 5,204,768 | 4/1993 | Tsakiris et al. | 340/825.72 |
| 5,307,055 | 4/1994 | Baskin et al. | 340/825.17 |
| 5,519,457 | 5/1996 | Nishigaki et al. | 348/734 |
| 5,581,251 | 12/1996 | McRight | 341/22 |
| 5,584,554 | 12/1996 | Moore et al. | 353/122 |
| 5,610,797 | 3/1997 | Nakamura | 361/681 |

OTHER PUBLICATIONS

*Extron Electronics 1995–1996 Product Catalog* (Anaheim, California)—p. 26, "System 8 & 10 Plus Switches" product description (1995).

*AMX Corporation 1996 Product Catalog* (Dallas, Texas)—p. 42, "PCS Power Current Sensor" product decription (1995).

*Primary Examiner*—Alpus H. Hsu
*Assistant Examiner*—Afsar Qureshi
*Attorney, Agent, or Firm*—Limbach & Limbach L.L.P.

[57] ABSTRACT

A method and apparatus for controlling a remotely located audio-visual projector. In preferred embodiments, the invention enables connection of any selected one of a number of input devices (such as video cassette recorders or computers) to the projector so that a sequence of different input devices can be selected during a single presentation. In preferred embodiments, the apparatus of the invention includes removable rubberized keys for selecting individual ones of the input devices, and pre-printed transparent labels that are backlit to identify each selected input device. In some embodiments, the apparatus of the invention includes a projector power status detection and indication subsystem which performs a calibration operation to determine one or more power threshold values and then uses each determined threshold value to determine the power status of the projector. Preferably, the control panel includes or is coupled to a processor that is operable in a learning node in which it is coupled to a special-purpose remote controller for use with the projector and learns projector control commands asserted by the special-purpose remote controller, and following the learning mode the control panel is operable in a normal mode in which it controls the projector by emulating the learned projector control commands.

5 Claims, 6 Drawing Sheets

DEVICE CONTROL APPARATUS HAVING INPUT DEVICE SELECTION SWITCH WITH RUBBERIZED KEY

FIELD OF THE INVENTION

The present invention relates to apparatus for controlling a remotely located audio-visual (AV) projector, to enable a user conveniently to make effective AV presentations. In particular, the invention is an AV projector control device that allows a user to control a remotely located projector (including by selecting a desired sequence of different projection input devices), either by manipulating controls on the control device or a remote controller coupled to the control device (but without the aid of another person), so that the user can better coordinate presentations.

BACKGROUND OF THE INVENTION

Effective presentations require coordinated AV systems. In making presentations, speakers generally use projectors to facilitate understanding of the subject matter of the presentation. In the past, presentations were made with simple overhead projectors that projected images of slides onto a larger screen. Overhead projectors merely provided visual aid.

To provide the audio aspect of the presentation, the speaker needed to either speak or coordinate another device, such as a tape recorder, with the overhead projector. With more than one device to control, speakers had difficulty coordinating the AV equipment without the help of another person.

Today, with modern AV equipment, speakers often make presentations using remotely located projectors that allow input from other devices, such as laptop computers and video cassette recorders (VCRs). Modern projectors have made presentations more effective by projecting an image from a computer monitor or television screen onto a much larger screen.

Throughout the disclosure, including in the claims, the expression "audio-visual control panel" (or "AV control panel") is used to denote an apparatus coupled to a remotely located AV projector and one or more input devices (e.g., laptop computers, VCRs, etc.), and configured to control the projector in response to user commands. Typically, each of the projector and the input devices is connected by a cable to the AV control panel, but it is contemplated that one or more of them can alternatively be coupled to the AV control panel by a wireless link. The user commands are typically entered by direct user manipulation of controls on the AV control panel, but it is contemplated that they can alternatively be entered by user manipulation of a remote control device coupled to the AV control panel.

Conventional AV controllers allow users to control remotely located projectors (the projectors are typically mounted in the ceiling), but do not provide an integrated patch point to connect various input devices to a remotely located projector so that a user can connect a sequence of different input devices to the projector during a presentation. Using some conventional AV controllers, a speaker can select a particular input device, switch to a different input device during the same presentation, and also adjust the projector output audio volume (and turn off and on the projector), all without assistance from an AV coordinator.

However, there is a need for a user-friendly AV control panel with integrated patch points having modular design so that it can conveniently and inexpensively be configured by an installer in any of a variety of ways (e.g., for use with different combinations of input devices), for an AV control panel which provides projector power status feedback efficiently to the user, and for an AV control panel which can learn the command set of any of a variety of projector remote control devices (and then control a projector using each learned command set).

SUMMARY OF THE INVENTION

In a class of embodiments, the invention is an AV projector control panel that can be mounted either into a wall or a podium so that a user can manipulate the AV control panel itself (or a remote control device in communication with the AV control panel) to control a remotely located projector. The invention allows the user to plug one or more input devices, including but not limited to VCRs and computers, into the control panel to provide input material to the projector. Preferably, one or more pre-installed cables connect the AV control panel to the remotely located projector.

The inventive AV control panel allows a user to control a remotely located projector as well as the projector's input devices by using a single control panel, preferably while the AV control panel provides projector power status feedback to the user. Thus, the invention makes it easier for average (nontechnical) users of AV projection equipment to control complicated AV projectors, and solves both the problems of how to connect one or more input devices with an AV projector and how to enable a user to control the projector and select a desired input device (and also receive feedback regarding projector status).

In a class of preferred embodiments, the inventive AV control panel includes circuitry configured to monitor the power status of the projector. By viewing a projector power status indicator on the AV control panel, the user can determine whether the projector is not working because the projector's power is off or because the projector is warming up.

In preferred embodiments, the inventive AV control panel includes a modular keypad comprising one or more rubberized input device selection keys. Thus, the control panel can conveniently be configured by an installer to include any of a variety of particular combinations of such keys, thus customizing the control panel for a particular user or class of users (so that the control panel's cost can be reduced if the control panel is installed in a simple configuration).

In other embodiments, the inventive AV control panel includes backlit slots (preferably electro-luminescent backlit slots) configured to receive transparent labels (preferably, preprinted polycarbonate labels). The labels correspond to input devices that are connected (or connectable) to the control panel. Preferably, the control panel includes circuitry for supplying power selectively only to the electro-luminescent light source(s) which illuminate the label(s) identifying each user-selected input device.

In other embodiments, the invention is an AV control panel that is configured to learn commands that are output by any special-purpose projector remote controller intended for use with a particular projector coupled to the AV control panel. When a command set has been learned, the AV control panel can control the projector using the learned command set while receiving power status feedback signals from the projector. During the learning mode, the remote controller device can be coupled to the AV control panel via an infrared signal receiving port on the AV control panel.

In alternative embodiments, the inventive control panel controls a remotely located device other than an AV projector (e.g., a monitor or other controllable device, such as a device that is controlled by encoded infrared radiation). The invention allows the user to plug one or more input devices, including but not limited to VCRs and computers, into the control panel to provide input material to the controllable device. Preferably, one or more pre-installed cables connect the control panel to the remotely located controllable device.

DETAILED DESCRIPTION OF THE PREFERRED EMBODIMENT

Figure 1:
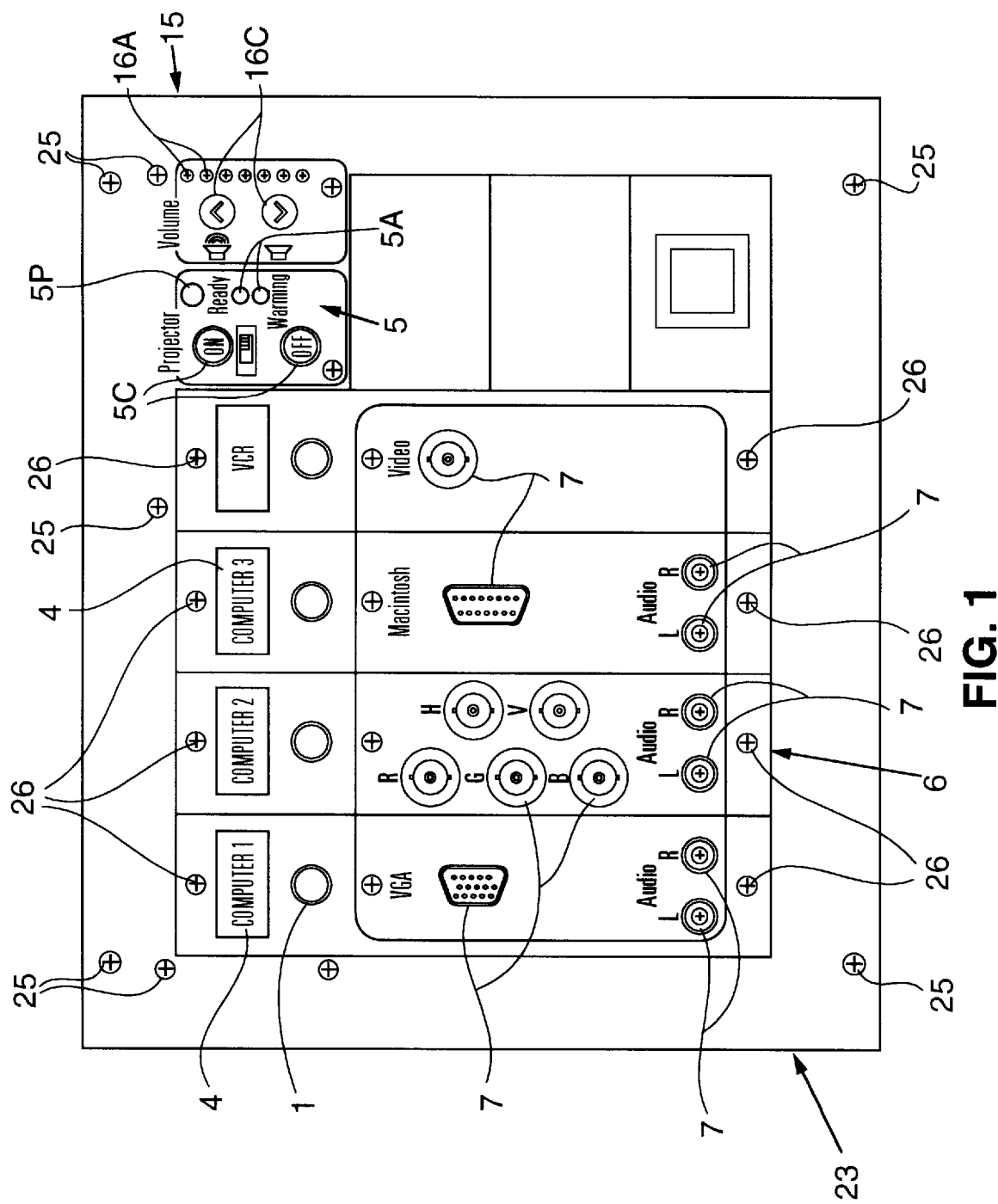
FIG. 1 is an elevational view of the front of a preferred embodiment of the AV control panel of the invention.

A preferred embodiment of the inventive AV control panel (identified by reference numeral 23) will be described with reference to FIGS. 1–4. A system including another embodiment of the inventive AV control panel (identified by reference numeral 123) and other elements, will then be described with reference to FIG. 5.

With reference to FIGS. 1–4, control panel 23 includes chassis front 15, printed circuit board (PCB) 12, and patch modules 6. It is intended that a projector (e.g., AV projector 14 of FIG. 5) remotely located from panel 23 is coupled to PCB 12 (and through to each of the connector terminals of modules 6) by a cable. Each of patch modules 6 can be mounted to chassis front 15 (by screws 26), or removed from chassis front. Chassis front 15 has holes 5E through which keys 5C and indicators 5A of projector power status subsystem 5 can be mounted, and holes 16E through which keys 16C and indicators 16A of volume control subsystem 16 can be mounted. Indicators 5A of subsystem 5 (which are preferably a pair of LEDs) are controlled by circuitry on PCB 12, so as to indicate whether a projector (remotely located from, but connected preferably by cable to panel 23) is off, on, or warming up.

Figure 3:
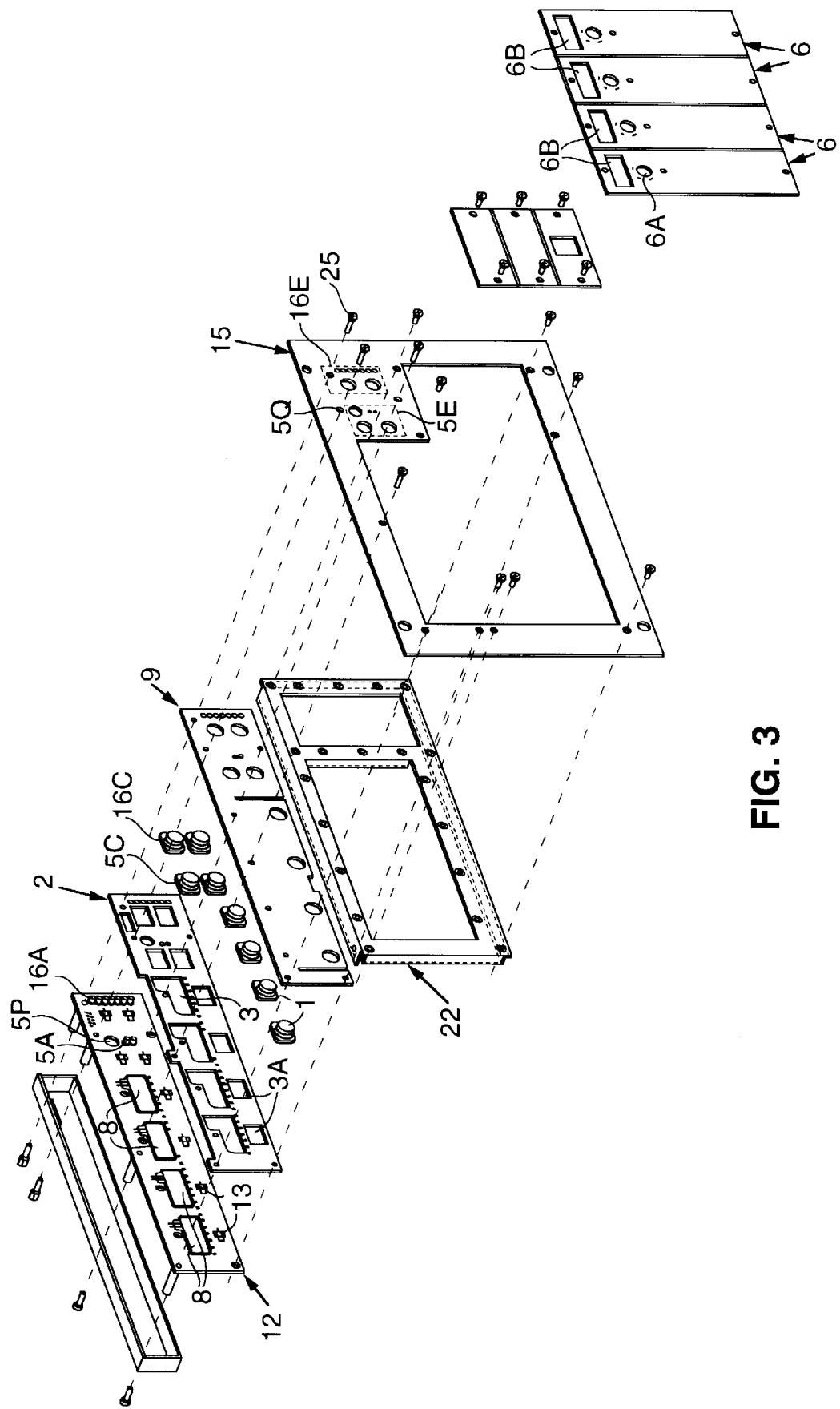
FIG. 3 is an exploded perspective view of some of the parts that are assembled to construct the FIG. 1 embodiment of the inventive control panel.
Figure 4:
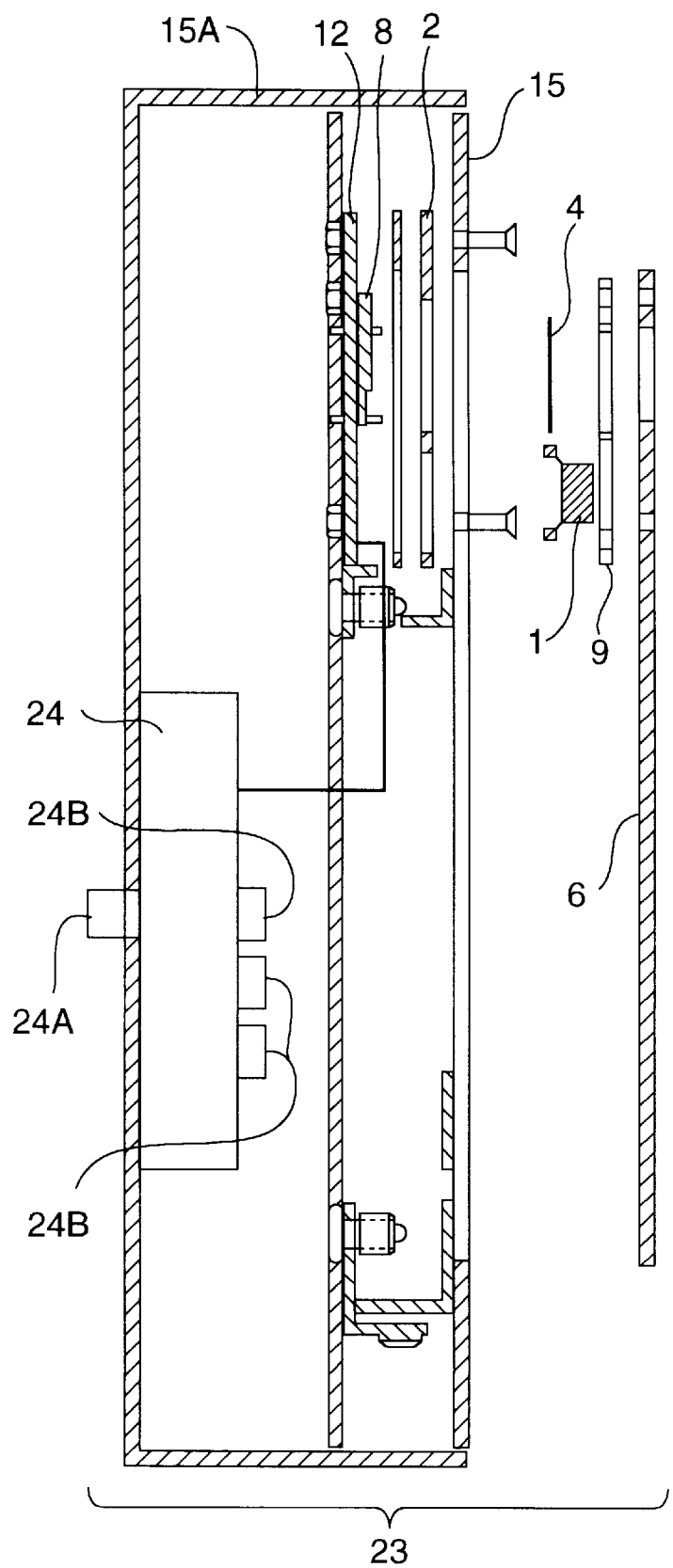
FIG. 4 is an exploded side cross-sectional view of the unassembled control panel of FIG. 1.

With reference to FIGS. 3 and 4, chassis front 15 is preferably designed to fit in a standard (e.g., 8"×10") backbox 15A. The following parts are assembled to backbox 15A: printed circuit board (PCB) 12, frame 2, clear plastic window 9 (sometimes referred to as a keypad retainer), module cage 22, chassis front 15, insertable patch modules 6, and switching circuitry 24. PCB 12 is installed under frame 2. Frame 2 has slots 3 for transparent labels 4 (shown in FIG. 4 but not FIG. 3) and slots 3A for mounting optional rubberized keys 1 (one such key 1 is shown in FIG. 4). Frame 2 is installed under clear plastic window 9, which keeps rubberized keys 1 and labels 4 in place. Clear plastic window 9 is installed over frame 2, labels 4, keys 1, indicators 5A and 16A, and keys 5C and 16C (a label 4 and a key 1 are shown in FIG. 4 but not FIG. 3) under module cage 22, to retain labels 4 and keys 1, 5C, and 16C. Module cage 22 (to which patch modules 6 can be attached) has holes through which a portion of each of keys 1, 5C, and 16C extends, and is installed beneath chassis front 15.

In response to user actuation of rubberized keys 5C, circuitry on PCB board 12 sends "power on" and "power off" commands to projector 14. Alternatively, circuitry on PCB board 12 sends a generic "power status change" command in response to each such key actuation, to cause the projector to change its power status (from on to off, or off to on) regardless of what is the current power status of the projector. In the latter alternative embodiments, projector power status feedback (via indicators 5A) is especially valuable.

In response to user actuation of rubberized keys 16C, circuitry on PCB 12 preferably sends appropriate "volume increase" or "volume decrease" commands to projector 14 (and illuminates corresponding ones of indicators 16A to indicate the user-specified projector output volume level). Alternatively (where circuitry on PCB 12 does not command the projector to attain any specific absolute output volume level), circuitry on PCB 12 sends "volume increase" commands to projector 14 while the user depresses a "volume increase" key 16C (and sequentially illuminates or "rolls" indicators 16A in a first direction to indicate that an unspecified "increase" in projector output volume level is being accomplished and then ceases to illuminate indicators 16A when the user no longer depresses the key) or such circuitry sends "volume decrease" commands to projector 14 while the user depresses a "volume decrease" key 16C (and sequentially illuminates or "rolls" indicators 16A in a second direction to indicate that an unspecified "decrease" in projector output volume level is being accomplished and then ceases to illuminate indicators 16A when the user no longer depresses such key).

Each input device (e.g., each input device 17 shown in FIG. 5) available for coupling to the projector (through control panel 23) is coupled to one or more patch points 7 (shown in FIG. 1) of one of the modules 6 installed in control panel 23. Patch points 7 are coupled either directly to the projector or to terminals 24B of switching circuitry 24 within control panel 23 (circuitry 24 and terminals 24B are shown in FIG. 4). PCB 12 within control panel 23 is also coupled to switching circuitry 24. Terminal 24A of circuitry 24 is adapted to receive one end of the projector cable (e.g., cable 14A of FIG. 5) coupled to the remotely located projector. In response to control signals from PCB 12, circuitry 24 connects any user-selected one of devices 17 to projector cable 14A, and thus via the projector cable to the projector.

It should be appreciated that in cases in which the projector itself includes adequate switching circuitry, the switching circuitry 24 can be omitted from control panel 23 (and instead patch points 7 can be coupled directly to the projector's internal switching circuitry).

PCB 12, frame 2, clear plastic window 9, module cage 22, and chassis front 15 are all held together by screws 25. Patch modules 6 are inserted over and attached to module cage 22 by screws 26. The installed patch modules 6 are level with the chassis front 15. Each of patch modules 6 optionally has an aperture 6A for one of rubberized keys 1, an aperture 6B for one of the transparent labels 4, and one or more apertures (not shown in FIG. 3) for the patch points 7 (shown in FIG. 1) used to connect input devices 17 to control panel 23. The patch modules 6 may be customized for the particular user in the sense any of the patch modules 6 can lack apertures for patch points (and can lack apertures 6A and 6B) if the user does not wish to have any corresponding patch points 7 or any corresponding rubberized key 1 and transparent label 4.

Still with reference to FIGS. 1–4, control panel 23 includes a selection keypad comprising one or more rubberized keys 1, frame 2 configured for mounting rubberized keys 1 (in slots 3A) and having slots 3 in which pre-printed labels 4 can be inserted. Electro-luminescent light sources 8 installed on PCB 12 are actuated to emit light for backlighting desired ones of labels 4 in response to user commands selecting corresponding ones of the input devices 17. Preferably, each label 4 is made of polycarbonate film which is transparent in the sense that it transmits light of one or more frequencies, and is marked with a legend which is visible when the label is backlit (each legend identifies one of the input devices, and can comprise pre-printed text or one or more pre-printed symbols). Alternatively, each label 4 is made of other material which is transparent in the sense that it transmits light of one or more frequencies, and is marked with a legend (identifying one of the input devices) which is visible when the label is backlit.

Indicators 5A of subsystem 5 (which are preferably LEDs) are coupled to circuitry on PCB 12, so that they can be illuminated by signals asserted by PCB 12 to indicate whether the remotely located projector is off, on, or warming up. Indicators 16A of subsystem 16 (which are preferably LEDs) are also coupled to circuitry on PCB 12, so that they can be illuminated by signals asserted by PCB 12 to indicate the volume output level of the projector.

The selection keypad has optional rubberized keys 1, each of which can either be installed (through one of slots 3A) between PCB 12 and element 9, or omitted during configuration of the system. Each of rubberized keys 1 is positioned to have a conducting portion that selectively contacts one of control circuitry terminals 13 on PCB 12, when actuated by a user. Each of keys 1 and the corresponding terminal 13 together comprise a switch (each key 1 has an electrically conductive portion which can complete a circuit on PCB 12 at one of terminals 13 when the key is in a first position, and open the circuit when the key is in a second position). In response to user actuation of any of keys 1, a circuit on PCB 12 (of which the corresponding terminal 13 is a node) is completed, and such circuit on PCB 12 asserts an input device selection signal to switching circuitry 24 (to be discussed below), or directly to switching circuitry within the projector, to cause a corresponding one of input devices 17 to be coupled to the projector.

If a user does not wish to have an input device 17 connected to a particular patch module 6, the user may choose to omit installation of the corresponding patch points 7 and the corresponding rubberized key 1. In this case, the user may choose to install a continuous module 6 (that does not have a rubberized key 1, patch points 7, or a connected input device 17) in chassis front 15. A user may find it desirable to remove (or to omit installation of) a rubberized key 1 that does not correspond to a connected input device 17, to prevent the user from mistakenly selecting such key and thus to reduce the risk of confusion.

In the preferred embodiment of FIGS. 1–4, frame 2 of control panel 23 has slots 3 configured to receive transparent labels 4, each of which labels identifies one of the connected input devices 17. The labels 4 may be pre-printed and inserted over electro-luminescent backlit slots 3 (in front of light sources 8) as shown in FIG. 4. When the user selects one of the input devices, the corresponding electro-luminescent light source 8 is illuminated by PCB 12, so that light radiates from the source 8 through the label 4 which bears a legend (e.g., "VCR" or "COMPUTER 1") identifying the selected input device (thereby backlighting such label).

Figure 2:
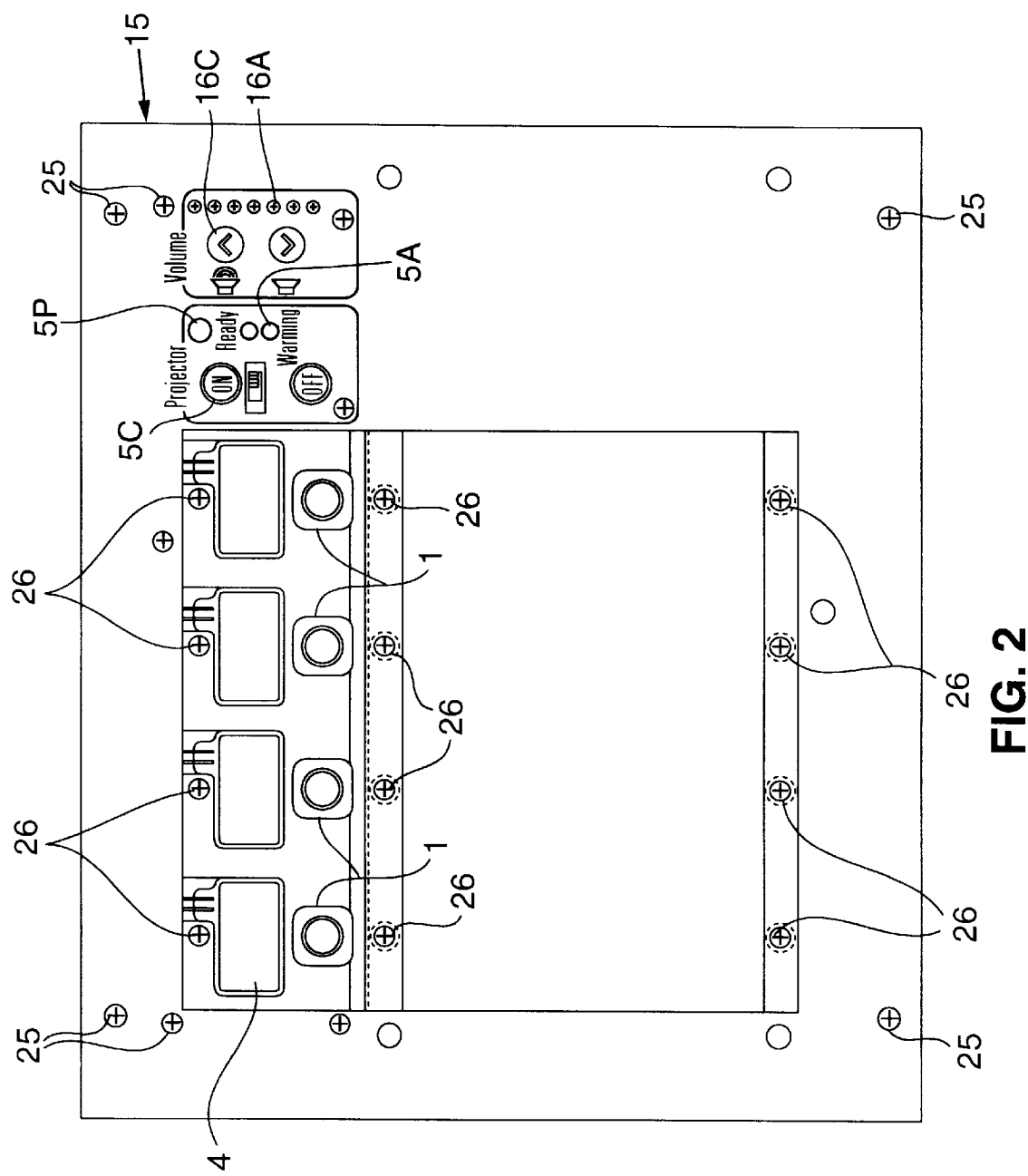
FIG. 2 is a front elevational view of the control panel of FIG. 1 with the patch modules removed.

As shown in FIGS. 1 and 2, each of labels 4 is marked (e.g., pre-printed) with a legend (or transmits light of a particular color) identifying a corresponding one of the input devices 17. The corresponding electro-luminescent light source 8 indicates the user's selection of a particular one of the input devices 17 when the user depresses the corresponding rubberized key 1. A clear plastic window 9 is installed over the labels 4, the rubberized keys 1, and frame 2 to keep the rubberized keys 1 and labels 4 in place, as shown in FIGS. 3 and 4.

Optionally, infrared signal receiving port 5P is coupled to circuitry on PCB 12. When installed, port 5P is visible from the front of chassis front 15 (as shown in FIGS. 1 and 2), since port 5P is aligned with aligned holes 5Q extending through control panel components 2, 9, and 15 (as shown in FIG. 3). In a projector command learning mode (to be described below with reference to FIG. 5), port 5P receives infrared signals encoded with the command set asserted by any of a variety of special-purpose projector remote control devices, and circuitry on (or coupled to) PCB 12 "learns" the command set (in a manner to be described below) and generates and stores data indicative of the learned command set for later use in controlling a projector coupled to the control panel.

Figure 6:
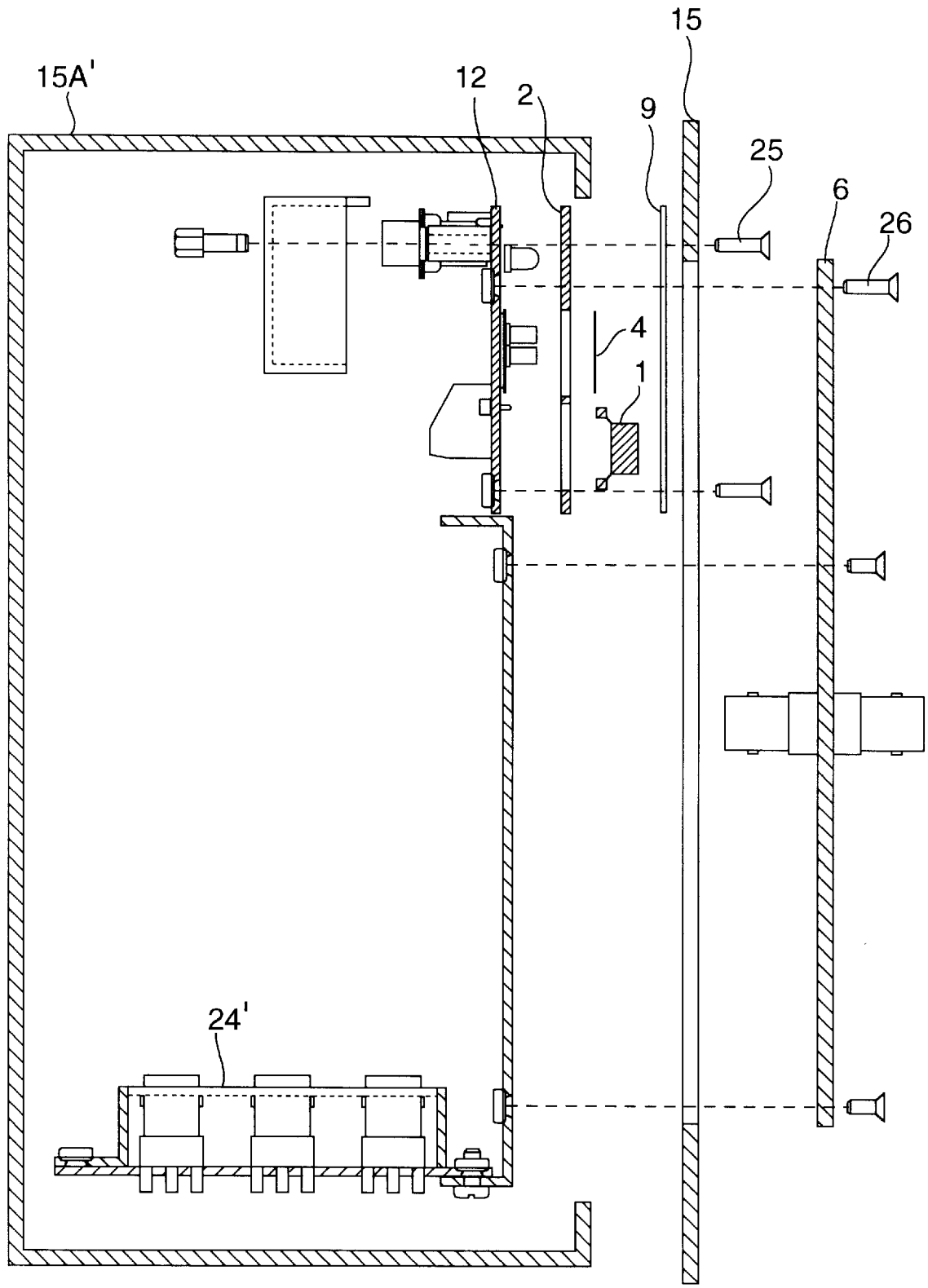
FIG. 6 is an exploded side cross-sectional view of an unassembled control panel, the control panel being a variation on the control panel of FIGS. 1 and 4.

FIG. 6 is an exploded side cross-sectional view of an unassembled control panel embodying the invention. This control panel is a variation on the control panel of FIGS. 1 and 4, and differs from the control panel of FIGS. 1 and 4 primarily in that backbox 15A' (and other frame elements) of FIG. 6 are shaped slightly differently from backbox 15A (and corresponding frame elements) of FIGS. 1 and 4, and in that switching circuitry 24' (which corresponds functionally to switching circuitry 24 of FIGS. 1 and 4) is mounted within backbox 15A' in a different position in the FIG. 6 embodiment than in the FIG. 4 embodiment. Other elements of the FIG. 6 embodiment that are identical to corresponding elements of FIGS. 1 and 4 are identically numbered in FIGS. 6 and 4, and the description of them set forth above will not be repeated with reference to FIG. 6.

Figure 5:
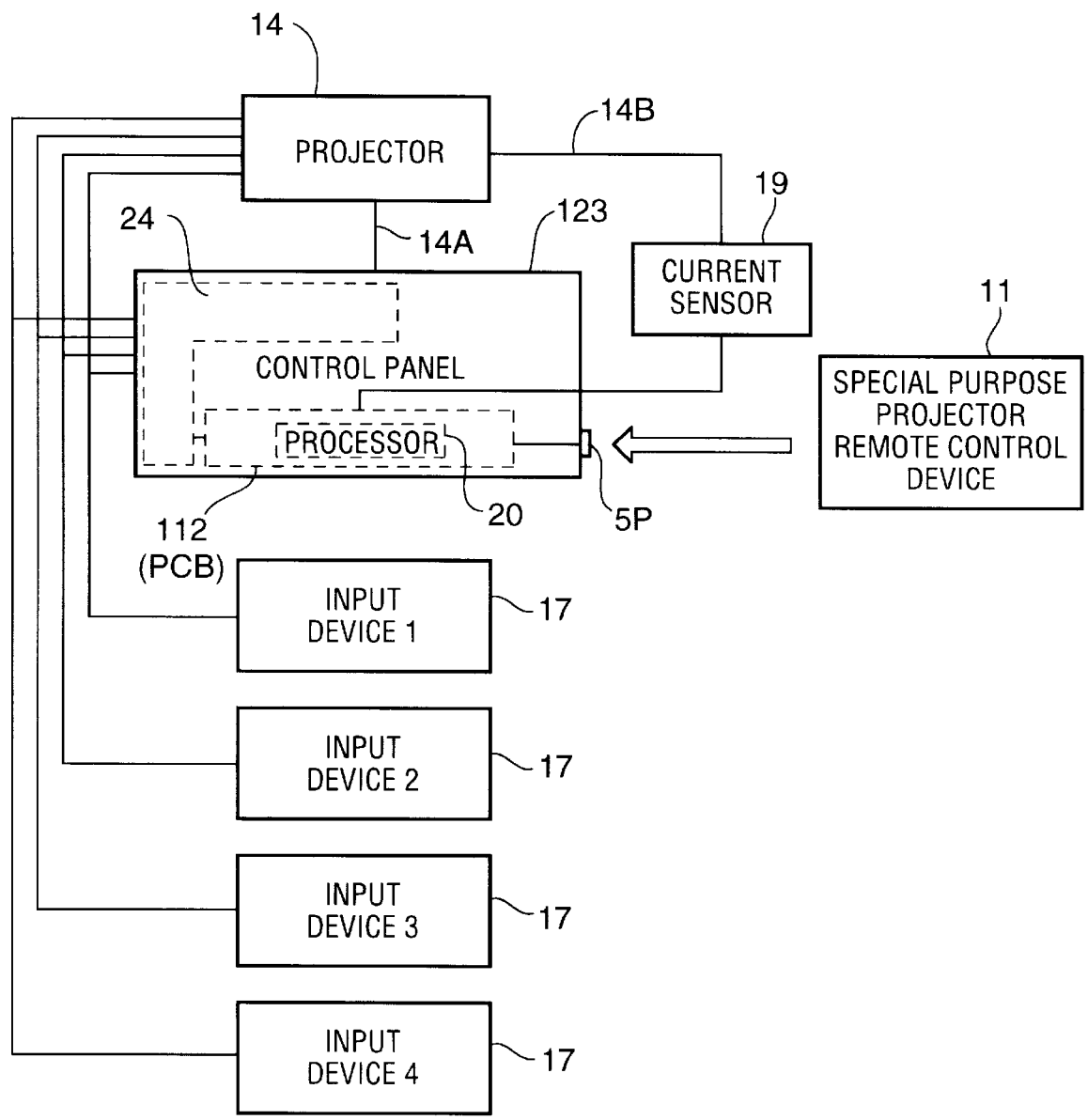
FIG. 5 is a block diagram of the circuitry of a preferred embodiment of a system embodying the invention.

In the FIG. 5 embodiment of the invention, AV control panel 123 is identical to AV control panel 23 (of FIGS. 1–4) except in that control panel 123 includes circuitry configured to perform learning of commands that are output by a special-purpose projector remote controller (device 11) intended for use with a particular projector (14) coupled tc AV control panel 123, and circuitry for responding to user-entered commands by asserting the learned commands directly to the projector.

As shown in FIG. 5, each input device 17 available for coupling to AV projector 14 (through control panel 123) is coupled to one or more patch points of one of the modules 6 (not shown in FIG. 5) of control panel 123, and these patch points are coupled to switching circuitry 24 within control panel 123 or directly to projector 14. PCB 112 within control panel 123, and optionally also projector cable 14A, are also coupled to switching circuitry 24. In response to control signals from PCB 112, circuitry 24 connects any user-selected one of devices 17 to cable 14A, and thus through cable 14A to projector 14.

A typical embodiment of projector power status detection and indication subsystem 5 will be described with reference to FIG. 5. Projector power status detection and indication subsystem 5 includes a current sensor 19 inductively coupled to power cord 14B of projector 14. Power is supplied (from a power source not shown) through cord 14B to remotely located projector 14 (when projector 14 has received a power on command through cable 14A). The current sensor 19 is configured to sense the current flowing in cord 14B (and thus the power being consumed by projector 14), and to convert the sensed current into a signal. The signal is indicative of the power being consumed by the projector 14, and is preferably a digital signal that is pulse width encoded to be indicative of the power value (alternatively the signal's frequency is proportional to the power value). The signal output from sensor 19 is used as feedback to processor 20 on PCB 112.

In a calibration mode (automatically executed once, each time a different projector 14 is connected to control panel 123), processor 20 sends a "power off" signal to remotely located projector 14 (through cable 14A), receives the resulting feedback signal from sensor 19, and generates and stores (in an internal memory) data indicative of projector 14's consumed power level when the projector's power status is "off." Processor 20 then sends a "power on" signal to projector 14, receives the feedback signal from sensor 19, and generates and stores (in the internal memory) data indicative of the projector's consumed power level when "on."

Processor 20 then determines (and stores) a threshold value midway between the data values indicative of the projector's "power off" and "power on" states. By executing such an automatic calibration operation, processor 20 generates and stores a threshold value which it can later compare to subsequently received signals from current sensor 19, to determine whether remotely located projector 14 is on or off. During normal operation of control panel 123, such threshold comparison operations are continuously performed. In response to such threshold comparison operations, PCB 112 illuminates appropriate ones of projector power status indicators 5A to indicate the power status of remotely located projector 14. Typically, control panel 123 is configured to illuminate the one of projector power status indicators 5A that is indicative of projector "warming up" status for a predetermined time interval (determined by timer circuitry on PCB 112) following each time the control panel determines that projector 14 has changed state from an "off" state to an "on" state.

It is contemplated that the inventive method of power status detection via intelligent thresholding can be applied to determine the power status of devices other than projectors, such as televisions, VCR's, etc.

If projector 14 is designed to assert its own power status signals (e.g., signals indicative of "off," "on," and "warming up" states), these signals are simply fed by cable 14A to panel 123. Otherwise, the above-described inductive current sensor and calibration operation are preferably employed to generate such power status signals.

The FIG. 5 embodiment of the invention includes circuitry (e.g., processor 20) within control panel 123 configured to learn (and then assert) the command set asserted by any of a variety of special-purpose projector remote control devices (e.g., special-purpose remote control device 11 which is configured to output infrared radiation encoded with commands in response to user manipulation of controls thereon). It is contemplated that each particular projector 14 coupled to control panel 123 will be designed to operate in response to a particular special-purpose projector remote control device.

Control panel 123 of the FIG. 5 system is configured to "learn" the projector control commands that are output by any of a variety of special-purpose projector remote controllers, such as special-purpose projector remote controller 11. Special-purpose remote controller 11 is assumed to have been manufactured to work with the specific model of projector 14 included in the FIG. 5 system. In the learning mode, infrared port 5P of control panel 123 receives infrared signals encoded with the command set output by special-purpose remote controller 11, and processor 20 processes data indicative of the received commands to identify each command in the set in the following sense. Processor 20 causes panel 123 to store (e.g., in an internal memory which is coupled to and is a part of PCB 112) a quantity of internal command data in response to each command received from special-purpose controller 11. Each quantity of internal command data is stored to be retrievable at an address corresponding to user actuation of a control (e.g., controls 5C or 16C) on control panel 123 that corresponds to one of the special-purpose controller commands. Thus, during normal operation following the learning mode, processor 20 within control panel 123 retrieves and executes the corresponding internal command (i.e., processes the corresponding internal command data) each time the user actuates one of the controls, with the result that control panel 123 asserts an output signal through cable 14A to projector 14, which output signal will be "recognized" by projector 14 as the corresponding command from special-purpose controller 11. During such normal operation following the learning mode, control panel 123 operates in a manner superior to the manner in which a conventional universal remote controller operates, in the sense that control panel 123 not only allows the user to control a remotely located projector, but control panel provides projector power status feedback to the user while the user controls the projector. In contrast, conventional universal remote controllers send signals to the projectors they control, but receive no signals indicative of projector status (and provide no projector status feedback to the user).

In some embodiments, some or all of the functions of processor 20 in the learning mode are performed by an appropriately programmed computer coupled (during the learning mode) to PCB 112 (e.g., via a port on the chassis of control panel 123). Such a programmed computer (which can be a conventional laptop computer that has been appropriately programmed) causes the internal command data to be stored within control panel 123 at the end of the learning mode, so that such internal command data can be accessed during normal mode operation following the learning mode. In these embodiments, processor 20 can be eliminated entirely or replaced by a simpler processor which performs only those functions not performed by the external computer.

Control panel 123 preferably performs the "learning mode" in a particularly efficient manner using the projector power status feedback signals received from sensor 19. These feedback signals are available as input to the circuitry (within control panel 123) which executes the learning mode operations, in addition to command set (typically determined by encoded infrared signals) from special-purpose controller 11. By processing such feedback signals in addition to the special-purpose controller command set itself, the circuitry which executes the learning mode operations can executed the learning mode operations in a particularly simple manner.

In variations on any of the described embodiments, the inventive control panel controls a remotely located device other than an AV projector (e.g., a monitor or other controllable device, such as a device that is controlled by encoded infrared radiation). The invention allows the user to plug one or more input devices, including but not limited to VCRs and computers, into the control panel to provide input material to the controllable device. Preferably, one or more pre-installed cables connect the control panel to the remotely located controllable device.

Various other modifications and alterations in the structure and method of this invention will be apparent to those skilled in the art without departing from the scope and spirit of this invention. Although the invention has been described in connection with preferred embodiments, the invention as claimed should not be unduly limited to such specific embodiment.

What is claimed is:

1. A device control apparatus, comprising:

control circuitry having first terminals and second terminals, said control circuitry being configured to generate a first input device selection signal in response to closing of a first switch and to generate a second input device selection signal in response to closing of a second switch, the first input device selection signal being capable of causing switching circuitry having an output terminal to connect a first input device with said output terminal, and the second input device selection signal being capable of causing the switching circuitry to connect a second input device with said output terminal;

a frame configured for mounting at least two rubberized keys in positions so that one of the keys selectively contacts the first terminals and another of the keys selectively contacts the second terminals; and a first one of the rubberized keys mounted to the frame in a position such that said first one of the rubberized keys selectively contacts the first terminals, wherein said first one of the rubberized keys is the first switch.

2. The apparatus of claim 1, also including:

a second one of the rubberized keys mounted to the frame in a position such that said second one of the rubberized keys selectively contacts the second terminals, wherein said second one of the rubberized keys is the second switch.

3. The apparatus of claim 2, also including a retaining element mounted over at least a portion of the frame and over at least a portion of each of the rubberized keys so as to retain the rubberized keys in said positions.

4. The apparatus of claim 3, wherein the retaining element is made of transparent material.

5. The apparatus of claim 1, also comprising:

first switching circuitry having terminals configured to be coupled to an audio-visual projector and to at least two projector input devices, and wherein the control circuitry is coupled to the first switching circuitry and configured to assert the first input device selection signal to the first switching circuitry in response to closing of the first switch and to assert the second input device selection signal to the first switching circuitry in response to closing of the second switch.

* * * * *